United States Patent [19]
Hikishima et al.

[11] Patent Number: 4,896,487
[45] Date of Patent: Jan. 30, 1990

[54] DRIVE SYSTEM FOR WALKING MOWERS

[75] Inventors: Keisaku Hikishima, Kobe; Hironobu Horie, Amagasaki; Kosaku Watanabe, Nishinomiya, all of Japan

[73] Assignee: Kanzaki Kokyukoki Mfg. Co. Ltd., Amagasaki, Japan

[21] Appl. No.: 194,328

[22] Filed: May 16, 1988

[30] Foreign Application Priority Data

Jun. 10, 1987 [JP] Japan ............................. 62-89419[U]

[51] Int. Cl.$^4$ ...................... A01D 69/06; A01D 69/08
[52] U.S. Cl. ..................................... 56/11.8; 180/19.1
[58] Field of Search ...................... 56/11.1, 11.3, 11.6, 56/11.7, 11.8; 180/19.1

[56] References Cited

U.S. PATENT DOCUMENTS

| | | | |
|---|---|---|---|
| 2,860,473 | 11/1958 | Wehner | 180/19.1 X |
| 2,996,134 | 8/1961 | Muerle et al. | 180/19.1 |
| 4,209,964 | 7/1980 | Fuelling, Jr. et al. | 56/11.8 X |
| 4,689,939 | 9/1987 | Seyerle | 56/11.8 X |

FOREIGN PATENT DOCUMENTS 61-135057  8/1986  Japan.
861920  3/1961  United Kingdom ............... 180/19.1

Primary Examiner—Stephen J. Novosad
Assistant Examiner—David J. Bagnell

[57] ABSTRACT

In a self-propelled walking mower having a deck as a machine frame for supporting an engine, mowing cutter and front wheels, a transaxle-type transmission for driving rear wheels is housed at a rear end portion of the deck in a transmission casing an upper half of which is provided by a portion of top wall of the deck and by a peripheral wall which is formed integrally with the deck and projected downwardly from the top wall of deck. The transmission may be assembled in a lower half of the transmission casing, or alternatively in the upper half, and then the two casing halves may be secured together for completing an essential part of the mower drive system. The upper casing half integral with the deck contributes not only to an easy assemblage of the drive system but also to a reduction of weight and size of the mower.

1 Claim, 6 Drawing Sheets

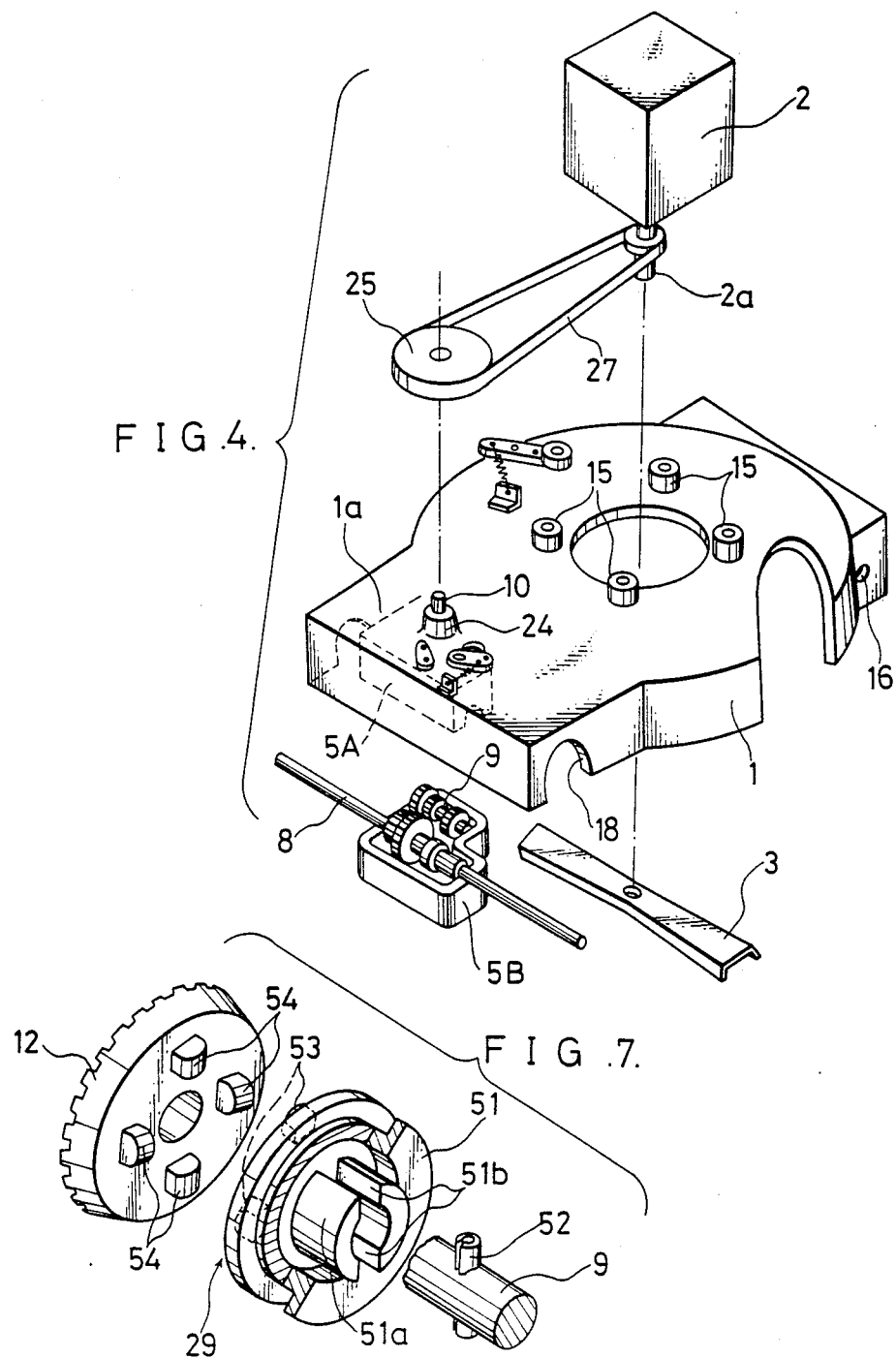

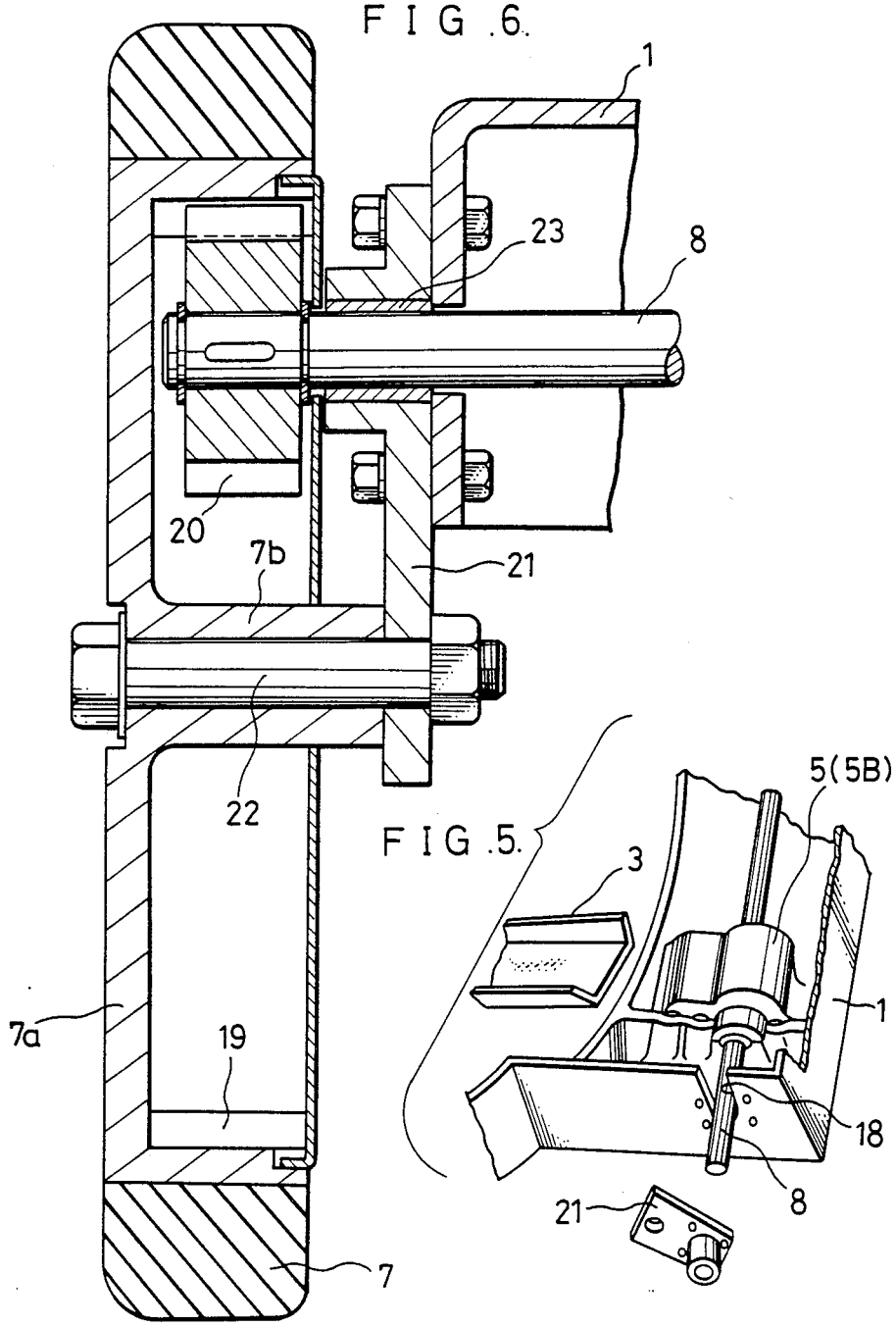

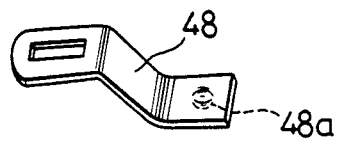
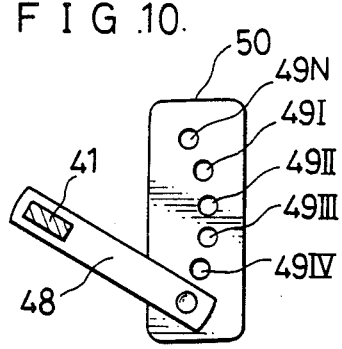
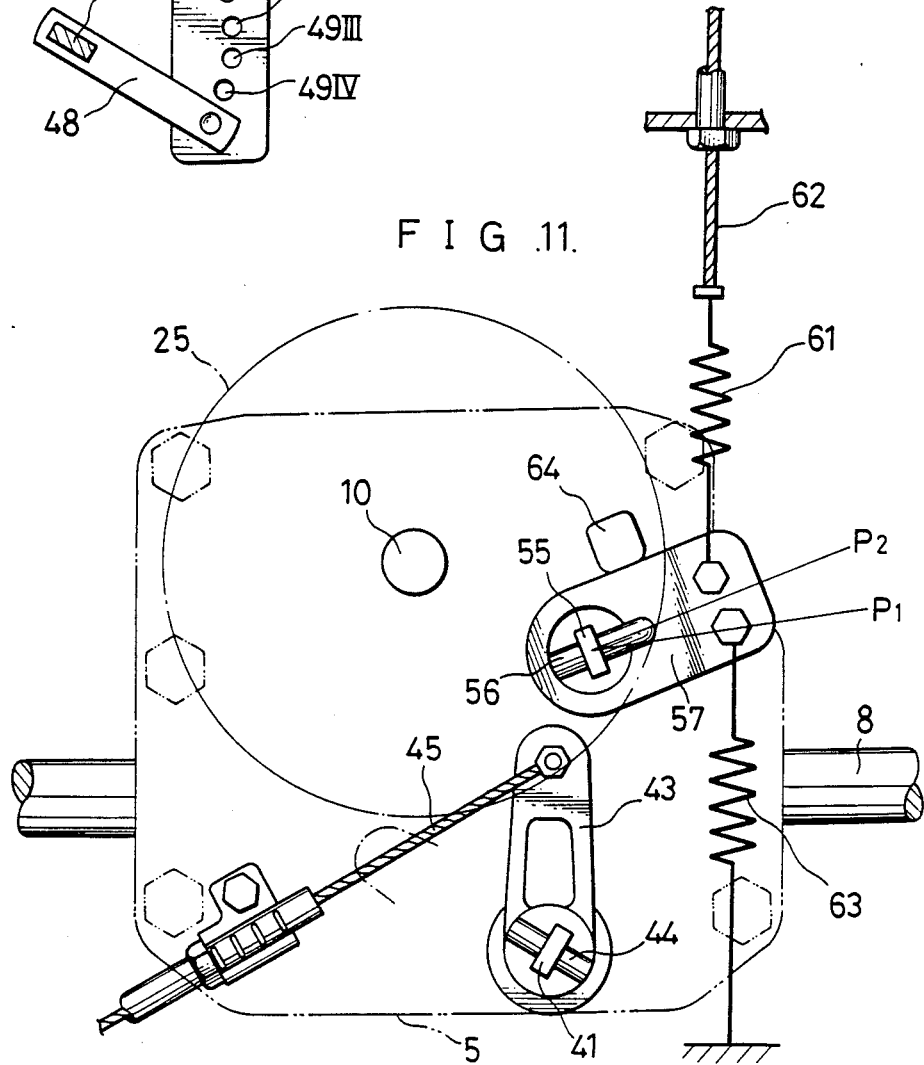

DRIVE SYSTEM FOR WALKING MOWERS

FIELD OF THE INVENTION

This invention relates to a drive system for self-propelled walking mowers.

BACKGROUND OF THE INVENTION

As well known, a self-propelled walking mower has as its machine frame a deck which mounts at its upper side an engine fixedly and supports at its lower side a mowing cutter rotatably. Such deck further supports at its front end portion freely rotatable left and right front wheels. Left and right rear wheels are used as drive wheels and are associated with a wheel axle which extends leftward and rightward from a transaxle-type transmission casing.

Such transmission casing is, in general, fixedly supported by a rear end portion of the deck, as shown in, for example, JP, A(U) No. 61-135057.

According to such prior art, a transmission mechanism is put into a transmission casing firstly and then the transmission casing is attached to the deck.

A primary object of the present invention is to provide a novel drive system for walking mowers in which structure and assemblage for a transmission casing are much simplified so as to enhance economy.

BRIEF DESCRIPTION OF THE DRAWINGS

Other objects and advantages of the invention will become readily apparent as the specification is considered in conjunction with the accompanying drawings, in which:

FIG. 4 is a schematic perspective view, showing an essential part of the walking mower shown in FIG. 3 in a disassembled state of the mower;

FIG. 5 is a schematic perspective view, partially exploded, of a part of the drive system shown in FIGS. 1 and 2, seen from a lower side of the system;

FIG. 6 is a vertical sectional view, showing a rear wheel assembly employed in the walking mower shown in FIG. 3;

FIG. 7 is a perspective view, partially broken away, of a clutch employed in the drive system shown in FIGS. 1 and 2;

FIG. 9 is a perspective view, showing a leaf spring of a detent mechanism employed in the drive system shown in FIGS. 1 and 2;

FIG. 10 is a plane view of the detent mechanism including the leaf spring shown in FIG. 9; and FIG. 11 is a plane view of a part of the drive system shown in FIGS. 1 and 2.

SUMMARY OF THE INVENTION

Figure 3:
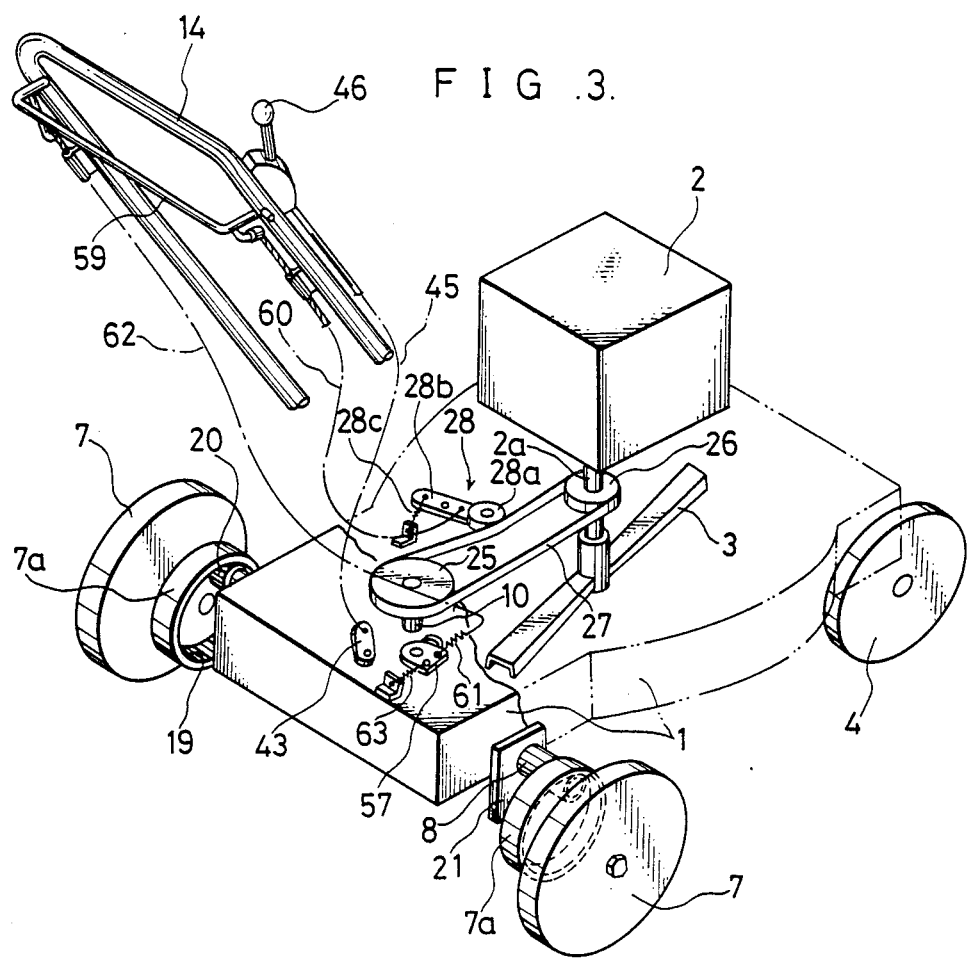
FIG. 3 is a schematic perspective view, partially cut away, of a self-propelled walking mower in which the drive system shown in FIGS. 1 and 2 is employed.

The present invention relates to a drive system for a self-propelled walking mower which has, as schematically shown in FIG. 3, a deck 1, an engine 2 arranged at an upper side of the deck 1 and fixedly supported by the deck, a mowing cutter 3 arranged at a lower side of the deck 1 and rotatably supported by the deck, and left and right front wheels 4 rotatably supported by the deck 1.

Figure 1:
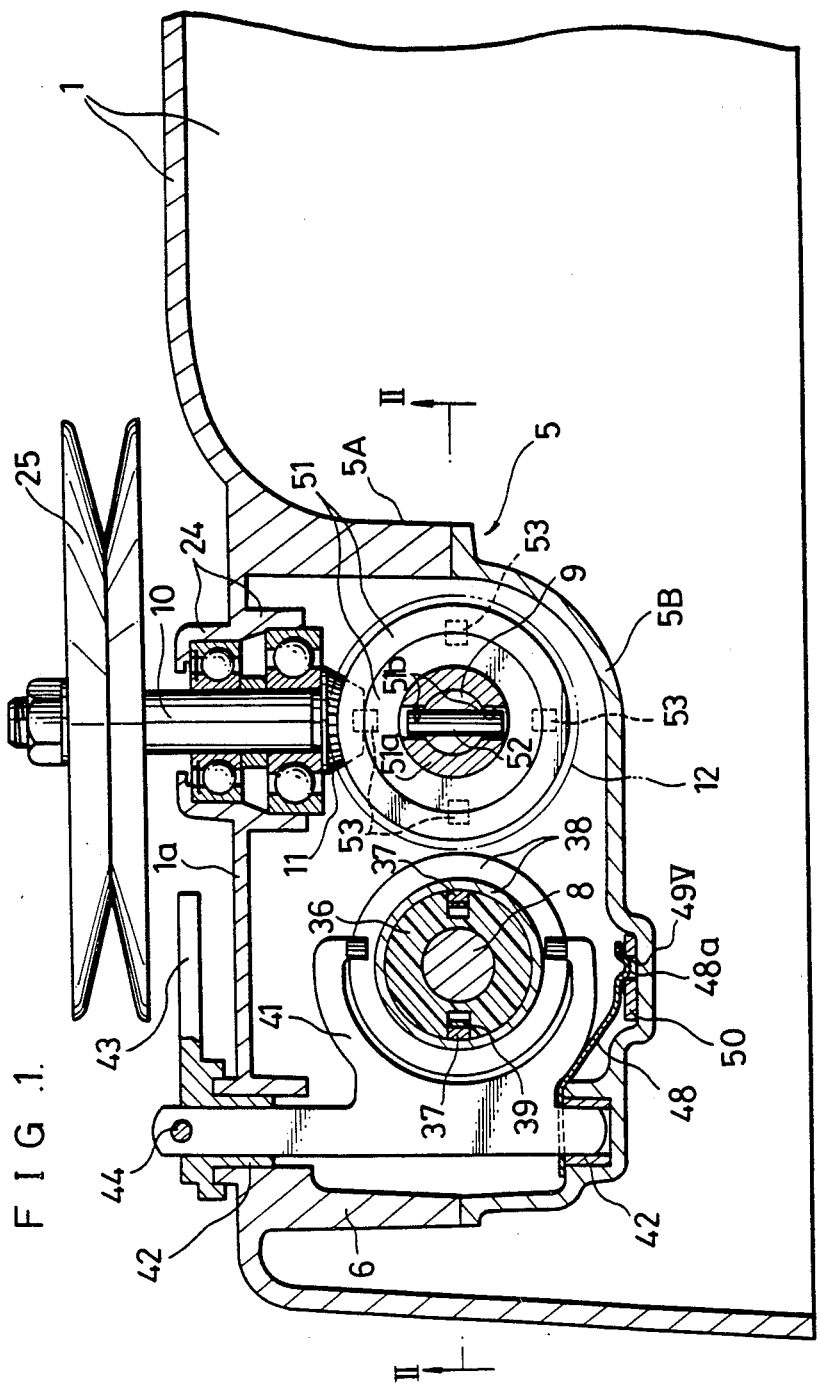
FIG. 1 is a sectional side view of an embodiment of the drive system for walking mowers according to the present invention.

As shown in FIGS. 1 and 4, the drive system comprises a transmission casing 5 arranged at a lower side of a rear end portion of the deck 1 and having upper and lower casing halves 5A and 5B which are secured together. The upper casing half 5A has a peripheral wall 6 which is formed integrally with the deck 1 and is projected downwardly from a top wall 1a of the deck so as to form the upper casing half 5A in cooperation with the top wall 1a.

Within the casing 5 are arranged a wheel axle 8 and drive shaft 9 which extend leftwards and rightwards. As can be seen from FIG. 2, each of these axle and shaft is embraced at axially spaced two portions thereof between and by the upper and lower casing halves 5A and 5B. The wheel axle 8 extends outwardly from the transmission casing 5 and has left and right rear wheels 7, shown in FIGS. 3 and 6, which are associated to the axle for co-rotation therewith. The transmission casing further includes therein a transmission mechanism 31, shown in FIG. 2, for transmitting power from the drive shaft 9 to the axle 8.

A vertical input shaft 10 which extends upwardly from the upper casing half 5A is supported rotatably by the top wall 1a of the deck 1. This input shaft is drivenly connected to the engine 2 through a belt 27 shown in FIGS. 3 and 4. Such input shaft 10 is drivingly connected within the casing 1 to the drive shaft 9 through meshing bevel gears 11 and 12.

The upper casing half 5A of transmission casing 5 can be formed at a same time when the deck 1 is produced by molding. Two pairs of axle-and shaft-embracing portions to be provided to each casing half 5A, 5B are shaped to have semi-circular cross-section and may be formed with ease when the deck 1 or lower casing half 5B is produced by molding.

In assembling the drive system, the whole of wheel axle 8, drive shaft 9, and transmission mechanism therebetween is assembled in the lower casing half 5B, as shown in FIG. 4, or, alternatively, in the upper casing half 5A in a condition where the deck 1 is turned over. The upper and lower casing halves 5A and 5B are then secured together so as to complete an essential part of the drive system.

It is thus seen that the present invention simplifies the structure and assemblage for a transaxle-type transmission casing considerably in comparison with the prior art which employs a separate transmission casing other than a deck. Consequently, manufacturing cost for a drive system for walking mowers is much reduced. Integration of the upper casing half 5A with a deck 1 further contributes to reducing weight and size of a walking mower.

DESCRIPTION OF A PREFERRED EMBODIMENT

In a walking mower the whole of which is shown schematically in FIG. 3 and an essential part of which is shown schematically in a disassembled state in FIG. 4, an upwardly and backwardly extending steering handle 14 shown in FIG. 3 is attached to a rear end portion of deck 1. For mounting the engine 2, the deck 1 has at a central area of its upper surface mounting bosses 15 shown in FIG. 4. The mowing cutter 3 referred to before is attached to the end of engine output shaft 2a so that it is supported rotatably by the deck 1 through the engine 2. For supporting left and right front wheels 4, a pair of left and right supporting bores 16, one of which is shown in FIG. 4, are formed in the deck 1 at a front end portion thereof.

Figure 2:
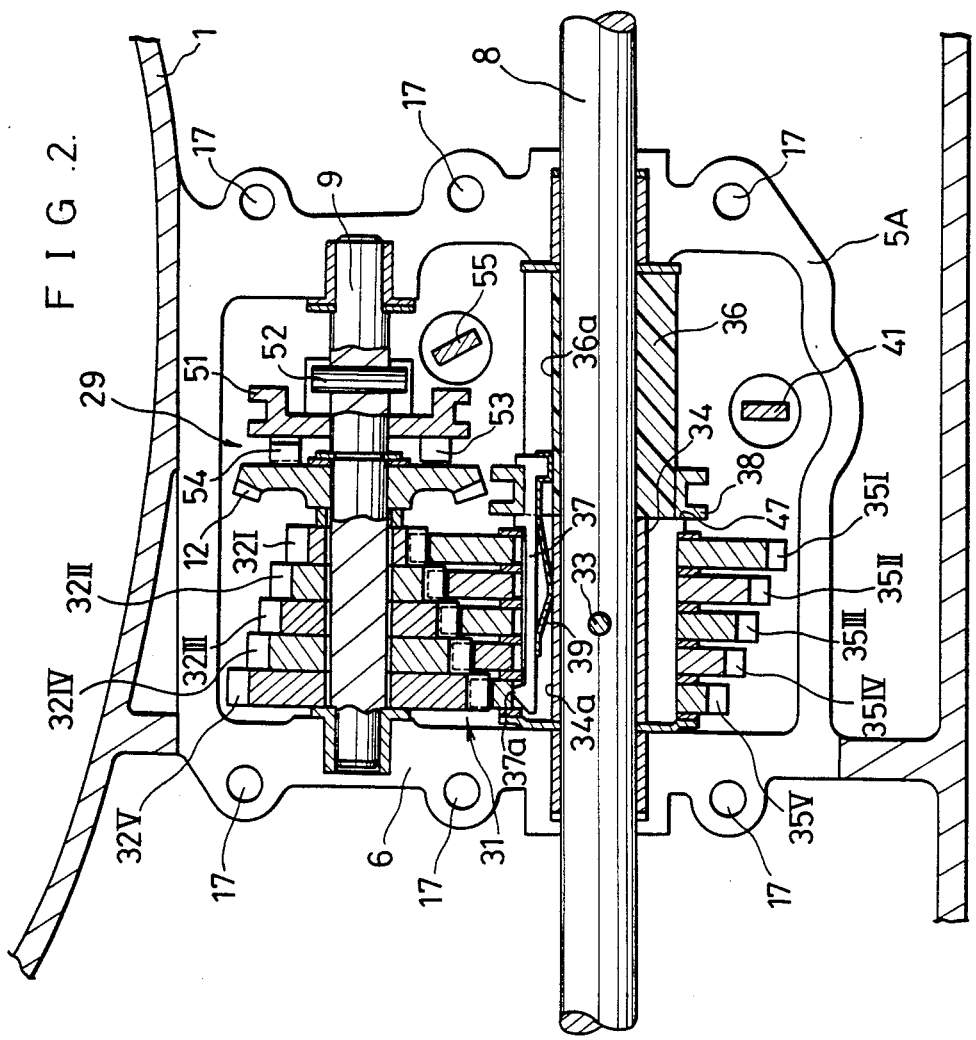
FIG. 2 is a sectional view taken generally along line II—II of FIG. 1.

As shown in FIGS. 1 and 2 and as already described before, the upper casing half 5A of transmission casing 5 is formed by a portion of the top wall 1a of deck 1 and by a peripheral wall 6 projected downwardly from the top wall 1a. Such upper casing half 5A integral with the deck 1 and the separately formed lower casing half 5B are jointed together at a horizontal plane which includes therein respective axes of the wheel axle 8 and drive shaft 9. Each of the axle 8 and shaft 9 is received at axially spaced two portions thereof and at respective radial halves thereof by semi-circular recesses formed in peripheral edges of the casing halves through bearing sleeves. Each of the peripheral edges of casing halves 5A and 5B includes bores 17 for passing fasteners or fastening bolts (not shown), as shown in FIG. 2 with respect to the upper casing half 5A.

Left and right end portions of the wheel axle 8 extend outwardly of the deck 1 through cut-out grooves 18 in side walls of the deck, as shown in FIG. 5. As shown in FIGS. 3 and 6, the wheel disk 7a of each rear wheel 7 is formed with an internal gear 19 with which a gear 20 attached to each end of the axle 8 is meshed so as to transmit rotation of the wheel axle to each rear wheel 7 with a reduced speed of rotation of about a quarter. To each side wall of the deck 1 is attached an axle-supporting plate 21 having a pin 22 secured thereto by which each rear wheel 7 is rotatably supported at a central boss 7b of the wheel disk 7a. Each end portion of the wheel axle 8 is supported by the plate 21 through a bushing 23.

The input shaft 10 referred to before is supported, as shown in FIG. 1, by a hollow cylindrical portion 24 formed in the top wall 1a of deck 1 through a pair of ball bearings and has at its upper end a pulley 25 secured thereto. As shown in FIG. 3, belt 27 is entrained over the pulley 25 and another pulley 26 fixedly mounted on the engine output shaft 2a. To the belt 27 is associated a belt-tightening clutch 28 which will be detailed later. As shown in FIGS. 1 and 2, the input shaft 10 has at its lower end an integral bevel gear 11 which meshes a larger bevel gear 12 on the drive shaft 9. The larger bevel gear 12 shown is mounted rotatably on the shaft 9 and is coupled selectively to the drive shaft by a clutch 29 which will be detailed later.

As shown in FIG. 2, transmission mechanism between the drive shaft 9 and wheel axle 8 includes a key-shift transmission 31. Five gears 32I, 32II, 32III, 32IV and 32V fixedly mounted on the drive shaft 9 are meshed respectively with five gears 35I, 35II, 35III, 35IV and 35V rotatably mounted on a hollow speed-change shaft 34, which is mounted on the axle 8 at a half axial length of such axle within the transmission casing 5 and is secured to the axle using a pin 33, so as to provide first to fifth speed-change gear trains. On the other axial half of the wheel axle 8 within the transmission casing 5 is mounted a hollow support shaft 36 of a synthetic resin. The speed-change shaft 34 and support shaft 36 have at the outer surfaces thereof axially aligned elongated grooves 34a and 36a within which shift keys 37 are slidably disposed. Each of these keys 37 is attached at a base end thereof to a shifter sleeve 38, slidably mounted on the support shaft 36, and is biased by a leaf spring 39 to move towards a direction such that a gear-engaging lug 37a on a free end of the key is projected radially outwardly of the speed-change shaft 34. Each of the gears 35I–35V on the speed-change shaft is formed at the inner circumference thereof with recesses into which gear-engaging lugs 37a of the shift keys may project so as to couple the gears 35I–35V one at a time to the shaft 34.

Figure 8:
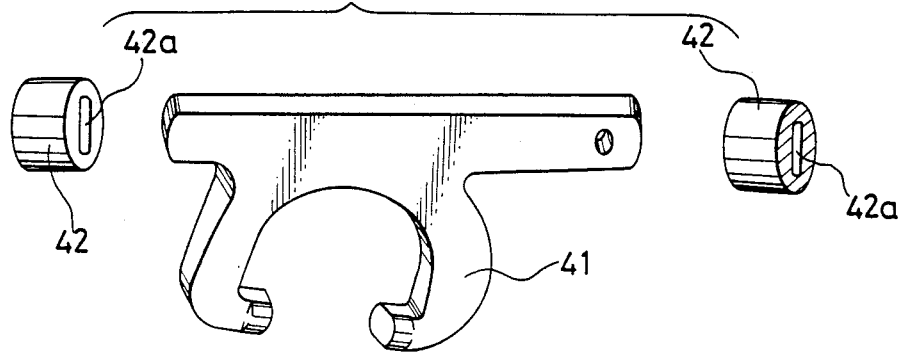
FIG. 8 is a perspective view, showing a shifter fork mechanism employed in the drive system shown in FIGS. 1 and 2 in a disassembled state.

For displacing the shifter sleeve 38 axially together with shift keys 37 for a speed change purpose, a shifter fork 41 is provided, as shown in FIG. 1, which is supported by the transmission casing 5 rotatably about a vertical axis and is engaged with the shifter sleeve 38. As shown in FIG. 8, this shifter fork 41 is made of a plate material by punching and is adapted to be supported by the transmission casing 5 rotatably through a pair of cylindrical members 42 each having a bore 42a into which a portion of the fork is fitted. As shown in FIG. 1, an upper end portion of the shifter fork 41 is projected upwardly of the top wall 1a of deck 1 and carries a shifter arm 43 which is formed integrally with one of the cylindrical members 42 and is prevented from getting-out by a pin 44. To the shifter arm 43 is attached a control cable 45 shown in FIGS. 3 and 11 which is connected to a change lever 46 provided to the steering handle 14.

As shown in FIG. 2, outer diameter of the speed-change shaft 34 is made somewhat larger than that of the support shaft 36 and an annular stopper face 47 for limiting the displacement of shifter sleeve 38 is provided by a portion of one end face of the speed-change shaft 34 which portion extends radially outwardly over the support shaft 36. A leaf spring 48 shown in FIG. 9 is carried by the shifter fork 41 co-rotatably, as shown in FIG. 1. A free end portion of this leaf spring 48 is formed with a projection 48a by pressing. On the inner bottom of transmission casing 5 is fixedly disposed a detent plate 50 having therein a plurality of intermittently arranged bores 49N, 49I, 49II, 49III, 49IV and 49V, as shown in FIG. 10, into which the projection 48a may fit selectively under the biasing of leaf spring 48. Bores 49I–49V are arranged so that, when gears 35I–35V are coupled respectively to the speed-change shaft 34 by the gear-engaging lugs 37a of shift keys 37, the projection 48a on the leaf spring 48 is aligned respectively to these bores 49I–49V. Bore 49N is arranged so that the projection 48a is aligned to this bore when the gear-engaging lug 37a is located at a position somewhat rightward, as viewed in FIG. 2, of the gear 35I. It is thus seen that a detent mechanism for latching the shift keys 37 and shifter sleeve 38 at their neutral and first to fifth-speed positions is provided by a combination of the leaf spring 48 and detent plate 50.

As shown in FIG. 3, the belt-tightening clutch 28 referred to before comprises a tightening roller 28a which tightens the belt 27 when it is pressed against the belt. This roller 28a is supported by a rotatable arm 28b which is biased by a spring 28c to rotate towards a direction to move the roller 28a away from belt 27. As shown in FIGS. 1 and 2 and in FIG. 7, clutch 29 disposed on the drive shaft 9 comprises a clutch sleeve 51 which is mounted slidably on the drive shaft. This sleeve includes at its boss portion 51a a pair of cut-out grooves 51b into which a pin 52 fixedly secured to the drive shaft 9 is projected so that the clutch sleeve 51 is co-rotatable with the shaft 9. The clutch sleeve 51 and bevel gear 12 on the drive shaft are formed, respectively, with lugs 53 and 54 which may be engaged mutually so as to couple the bevel gear 12 to the shaft 9. For displacing the clutch sleeve 51 axially of the drive shaft, a control fork 55 shown in FIGS. 2 and 11 is provided which is similar to the shifter fork 41 shown in FIGS. 1 and 8 and is engaged to the sleeve 51. As shown in FIG. 11, the control fork 55 which is supported by the transmission casing 5 rotatably along a vertical axis has an upper end portion, projected upwardly from the casing 5, at which the fork 55 carries a co-rotatable clutch arm 57 in cooperation with a pin 56.

Two clutches 28 and 29 detailed above are controlled together by a clutch lever 59 which is provided, as shown in FIG. 3, to the steering handle 14. For this, the rotatable arm 28b is connected to such clutch lever 59 through a control cable 60 and the clutch arm 57 is connected to the clutch lever through a spring 61 and control cable 62. As clearly shown in FIG. 11, the clutch arm 57 is biased by another spring 63 to move towards a direction away from the spring 61 and cable 62. The clutch 29 is fashioned such that the clutch sleeve 51 shown in FIG. 2 is located at a clutch-disengaging position under the biasing of such another spring 63 when the clutch lever 59 is not grasped or operated. Position $P_1$ shown in FIG. 11 represents a corresponding clutch-disengaging position of the clutch arm 57 from which position the arm 57 is rotated by an operation of the clutch lever 59 through the cable 62 and spring 61 to a position $P_2$ shown in FIG. 11 where the clutch 29 becomes engaged. On the upper surface of transmission casing 5 and, therefore, on the upper surface of top wall 1a of the deck 1 is disposed a stop 64 which limits the rotation of clutch arm 57 at the clutch-engaging position $P_2$.

It is fashioned that, when the clutch lever 59 is grasped or operated from the disengaged condition of clutches 28 and 29, clutch 29 becomes engaged firstly. That is, the rotatable arm 28B shown in FIG. 3 still takes, when the clutch arm 57 has reached the clutch-engaging position $P_2$ shown in FIG. 11, a position where tightening of the belt 27 by the tightening roller 28a is not caused. A further grasping of the clutch lever 59 will cause a displacement of the rotatable arm 28b to its belt-tightening position while causing a tension of the spring 61 at the side of clutch arm 57. When the clutch lever 59 is released, spring 61 becomes shortened so as to pull the cable 62 towards such spring 61. The clutch lever 59 will go down to loosen the cable 60, and the rotatable arm 28b will be rotated by the force of spring 28c to disengage the belt-tightening clutch 28. Then, the clutch arm 57 will be rotated by the force of spring 63 to the position $P_1$ shown in FIG. 11 to disengage the clutch 29.

The walking mower shown in driven to travel for a mowing purpose with the clutch lever 59 being grasped by an operator behind the mower. Before a shifting operation of the keyshift transmission 31, the clutches 28 and 29 are disengaged by releasing the clutch lever 59. Such clutches 28 and 29 are also disengaged when the operator intends to retreat the mower by pulling the steering handle 14 for unmowed turfs found behind him or the like. Owing to the provision of clutch 29, the speed-reduction gearing of a high reduction ratio comprising smaller and larger bevel gears 11 and 12 does not resist against a mower-retreating operation so that a retreat of the mower can be achieved with ease. When the clutch lever 59 is grasped again for engaging the clutches 28 and 29, the belt-tightening clutch 28 which may tighten the belt 27 gradually without causing a shock becomes engaged after the clutch 29 has been engaged. Consequently, a sudden start of the rotation of rear wheels 7 which might cause a floating condition of the front wheels 4 is well avoided and the mower will start in a smooth manner owing to a shock-free engaging of the belt-tightening clutch 28.

We claim:

1. In self-propelled walking mower having a deck, en engine arranged at an upper side of said deck and fixedly supported by the deck, a mowing cutter arranged at a lower side of said deck and rotatably supported by the deck, and left and right front wheels rotatably supported by said deck, a drive system comprising:

a transmission casing arranged at a lower side of a rear end portion of said deck and having upper and lower casing halves which are secured together, said upper casing half having a peripheral wall which is formed integrally with said deck and is projected downwardly from a top wall of the deck so as to form said upper casing half in cooperation with said top wall;

a wheel axle and drive shaft each extending leftwards and rightwards within said transmission casing and embraced at axially spaced two portions thereof rotatably between and by said upper and lower casing halves, said wheel axle extending outwardly from said transmission casing and having left and right rear wheels associated thereto for co-rotation, a transmission mechanism disposed within said transmission casing for transmitting power from said drive shaft to said wheel axle; and a vertical input shaft extending upwardly from said upper casing half and supported rotatably by said top wall, said input shaft being drivenly connected to said engine through a belt and drivingly connected to said drive shaft through meshing bevel gears disposed within said transmission casing.

* * * * *

UNITED STATES PATENT AND TRADEMARK OFFICE
CERTIFICATE OF CORRECTION

PATENT NO.  : 4,896,487

DATED       : January 30, 1990

INVENTOR(S) : Keisaku Hikishima et al

It is certified that error appears in the above-identified patent and that said Letters Patent is hereby corrected as shown below:

Col. 6, line 22 insert --a-- after "In" and change "en" to --an--.

Signed and Sealed this

Nineteenth Day of March, 1991

Attest:

HARRY F. MANBECK, JR.

Attesting Officer

Commissioner of Patents and Trademarks